Aug. 13, 1968   J. A. CHRISTIE   3,397,100
PATCH PROCESS
Filed June 24, 1965

INVENTOR.
JOHN A. CHRISTIE
BY
ATTORNEY

United States Patent Office 3,397,100
Patented Aug. 13, 1968

3,397,100
PATCH PROCESS
John A. Christie, Akron, Ohio, assignor to The Technical Rubber Co., Johnstown, Ohio, a corporation of Ohio
Filed June 24, 1965, Ser. No. 466,545
3 Claims. (Cl. 156—97)

ABSTRACT OF THE DISCLOSURE

A thin patch of compounded rubber is adhered to a heated tire or tube or the like which has been treated with a solvent and an ultra-accelerator.

---

This invention relates to a method of patching a rubber surface with a thin patch sheet of compounded rubber stock. Usually sheets of gum stock, about 1/64 inch thick are used, and in no case is the patch thicker than about 1/32 inch. Such patches are used in patching tires, tubes, etc.

In the past, sheets of sulfur-curable rubber stock have been used and these have been adhered to products to be repaired by brushing on to them a sulfur-free rubber cement which contains an ultra-accelerator. (By "ultra-accelerator" I refer to the class of unusually powerful accelerators typified by thiuram sulfides and dithiocarbamates.) One difficulty with this procedure is that when the brush contacts the sulfur-containing rubber stock, it picks up sulfur, and when it is returned to the cement this sulfur is added to the rubber cement in sufficient quantity to vulcanize the rubber cement so that it soon becomes unusable. A further difficulty is that patches prepared in this way take 24 to 48 hours to cure at room temperature.

According to the invention, the accelerator is not added to a rubber cement, but it is added to a solvent for the accelerator such as has been used in the past for the preparation of a cement to be used as just described. These solvents penetrate the uncured rubber patch and carry the accelerator into it when brushed or sprayed on to the rubber. Brushing does not create the problem inherent in brushing a rubber cement on to the patch because even though sulfur is transferred to the solution by the brush it will do no harm because the solution contains no rubber. A convenient method of applying the solution is from an aerosol can. If a metal can is used, the interior should be protected by an impervious lining.

The invention is illustrated in the accompanying drawings, in which—

Figure 1:
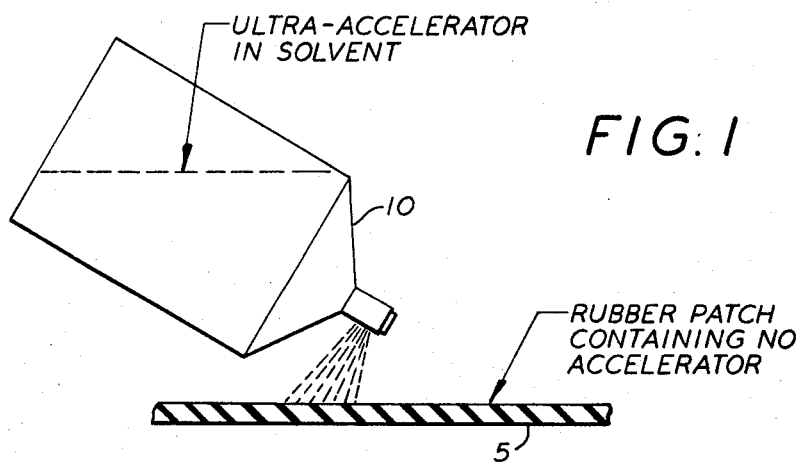
Figure 2:
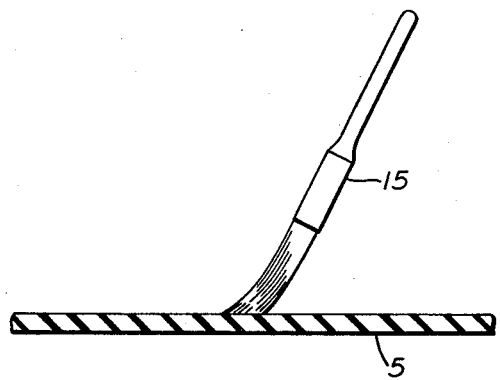

FIGURE 1 illustrates spraying the accelerator solution on to a patch from an aerosol can; and FIGURE 2 illustrates brushing the accelerator solution on to the patch.

The patch 5 may be of any composition commonly used as repair stock. It usually contains all of the compounding ingredients necessary to produce a cure, except the accelerator. However, some or all of the sulfur and other compounding ingredients in addition to the accelerator, may be dissolved in the solvent. The following patch composition is illustrative:

| | Parts by weight |
|---|---|
| Hevea rubber | 100 |
| Zinc oxide | 5 |
| Stearic acid | 1 |
| Sulfur | 2 |

The accelerator solution supplied either by spraying, as from the aerosol can 10 of FIGURE 1, or by the brush 15 of FIGURE 2 is composed of a relatively low boiling solvent such as benzene, toluene, trichlorethylene, etc. Usually, the ultra-accelerator will be a zinc salt of diethyl, dimethyl or dibutyl dithiocarbamate. A typical formula is 5 to 10 percent by weight of diethyl dithiocarbamate in benzene.

The operation is carried out somewhat as follows: The rubber surface which is to be patched is heated sufficiently to cause the patch to be quickly vulcanized. A temperature of 200 to 230° F. is quite satisfactory. The rubber sheet is laid out flat and sufficient accelerator solution is applied to it to make the surface adhesive and provide the desired rapid cure. After allowing sufficient time for the accelerator to penetrate the patch and thus to make the surface of the patch adhesive, this surface is pressed on to the heated surface.

The patch is cured and permanently adhered to the rubber surface in a matter of minutes, without applying additional heat.

The temperature is so low that the rubber will not become porous so it is not necessary to use pressure pads during the cure. A convenient source of heat is an infrared lamp. An advantageous heating procedure is to apply a small amount of water to the surface to be patched, and as soon as it starts to steam it is known that it has been heated to at least about 212° F. and is ready for patching.

The invention is covered in the claims which follow.

What I claim is:

1. The method of patching a rubber surface with a thin-sheet rubber patch, which comprises heating said surface to a temperature of substantially 200 to 230° F., applying to one surface of the patch a rubber-free solution of ultra-accelerator in a low-boiling solvent, there being no accelerator in the patch but all the ingredients necessary for a sulfur cure being present in the rubber patch and the solvent together, allowing the solvent to dissolve in the rubber while the treated surface becomes tacky, and then pressing the patch to the heated rubber surface.

2. The process of claim 1 in which the solvent contains only the dissolved accelerator and no other rubber compounding ingredient.

3. The process of claim 1 in which the surface to be patched is treated with water, and just before patching it is heated until the water is converted to steam.

References Cited

UNITED STATES PATENTS

| 2,638,955 | 5/1953 | Gruber | 156—97 X |
| 3,005,740 | 10/1961 | Halko | 156—97 X |
| 3,095,342 | 6/1963 | Kraly | 156—97 |

EARL M. BERGERT, Primary Examiner.

CLIFTON B. COSBY, Assistant Examiner.